April 2, 1963     J. M. SCHWEIHS     3,083,905
CAM CUT-DOWN CALCULATOR
Filed July 7, 1960     2 Sheets-Sheet 1
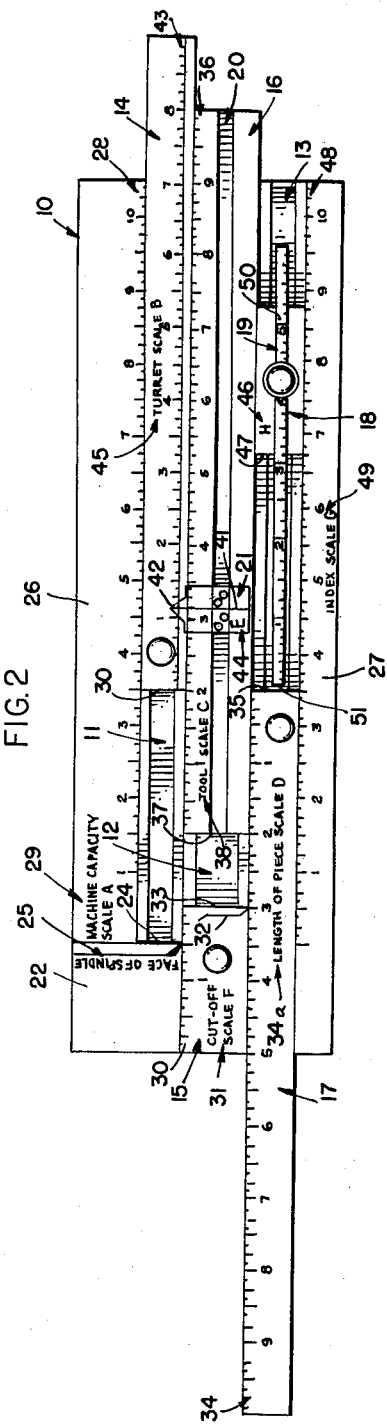
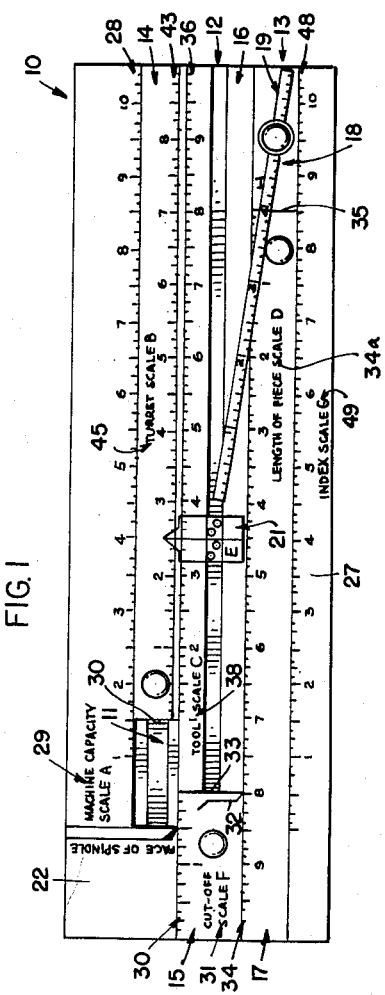
INVENTOR:
JAMES M. SCHWEIHS
BY
*Mayall, Johnston, Cook + Root*
ATT'YS April 2, 1963  J. M. SCHWEIHS  3,083,905
CAM CUT-DOWN CALCULATOR
Filed July 7, 1960  2 Sheets-Sheet 2

INVENTOR:
JAMES M. SCHWEIHS
BY
Marzall, Johnston, Cook & Root
ATT'YS

United States Patent Office 3,083,905
Patented Apr. 2, 1963

3,083,905
CAM CUT-DOWN CALCULATOR
James M. Schweihs, Maywood, Ill., assignor to Jay-Tee Screw Machine Products Co., Melrose Park, Ill., a copartnership
Filed July 7, 1960, Ser. No. 41,293
7 Claims. (Cl. 235—70)

This invention relates in general to an instrument for use in designing cams for automatic screw machines, and more particularly to an instrument for determining cam cut-down on the lead cam of an automatic screw machine and whether clearance exists between a turret tool and the work piece while the turret is indexing, and still more particularly to a cam cut-down calculator.

Automatic screw machines are used for the production of machined parts in quantities from bar stock. Various machining operations are performed on the bar stock while it is firmly held in a rotating chuck or spindle. After the machining operations are performed, the part is completed by cutting it from the bar stock thereby defining a machined piece part. Certain metal cutting operations are performed on the piece part by tools held in a turret, while other operations may be performed by tools held in cross slides. The turret is capable of holding several tools of various lengths and is indexed between machining operations performed by the various tools. Further, the turret is indexed on an axis extending perpendicular to the rotational axis of the spindle and bar stock. In order to perform the machining operations on the bar stock by the tools mounted in the turret, it is necessary to advance the turret toward and away from the spindle. Thus, the turret is mounted on a slide which is controlled by a lead cam. When designing cams for an automatic screw machine, it is necessary to design and construct the lead cam to provide the proper cut-down thereon in accordance with the various lengths of machining or approach on the bar stock by each tool mounted in the turret.

Heretofore, cam cut-down has been determined by laying out the machining operation on a scale drawing which is time consuming and difficult to perform with consistent accuracy. Also, it has been difficult in the past to accurately determine whether a turret tool would clear the work piece or bar stock during indexing from one position to another since this also had to be laid out on a scale drawing.

Accordingly, it is an object of the present invention to provide an instrument for determining the cut-down on the lead cam of an automatic screw machine for a given setup situation.

Another object of this invention is in the provision of an instrument for determining whether a turret tool will clear the work piece or piece part while indexing.

A further object of this invention is to provide an instrument capable of quickly and easily determining the cam cut-down on the lead cam of an automatic screw machine for any given machining operation, and for additionally determining whether the turret tool will clear the piece part while indexing.

A still further object of this invention resides in the provision of a cam cut-down calculator for determining the cut-down on the lead cam of an automatic screw machine by visualizing the machining operation on the calculator.

Another object of this invention is to provide a cam cut-down calculator for determining the cut-down of the lead cam on any automatic screw machine where the machine capacity is illustrated in the form of turret scales permitting one to work the full capacity of the machine with ease.

A still further object of this invention is in the provision of a cam cut-down calculator which eliminates any possibility of error in determining the cut-down of a lead cam for an automatic screw machine.

A further object of this invention is in the provision of a cam cut-down calculator which reduces costs in design of lead cams by saving time in calculating cut-downs and eliminating the necessity of scrapping cams because of improper cut-downs.

A still further object of this invention resides in the provision of a cam cut-down calculator capable of instantly calculating turret tool clearance of a piece part while indexing.

Another feature of the invention is in the provision of a cam cut-down calculator capable of accurately determining cam cut-downs in a lead cam and thereby promoting better accuracy of the piece part or work piece.

A further object of this invention resides in the provision of a cam cut-down calculator for accurately determining cut-downs on the lead cam of an automatic screw machine, whereby the danger of damaging turret holes due to excessive turret tool overhang is eliminated.

Other objects, features, and advantages of the invention will be apparent from the following detailed disclosure, taken in conjunction with the accompanying sheets of drawings, wherein like reference numerals refer to like parts, in which:

FIG. 1 is a plan view of the cam cut-down calculator of the present invention;

FIG. 2 is a plan view of the cam cut-down calculator of FIG. 1 and with the parts in position of a particular setup for determining the cam cut-down on a lead cam and whether tool clearance exists between the turret tool and the piece part;

Figure 3:
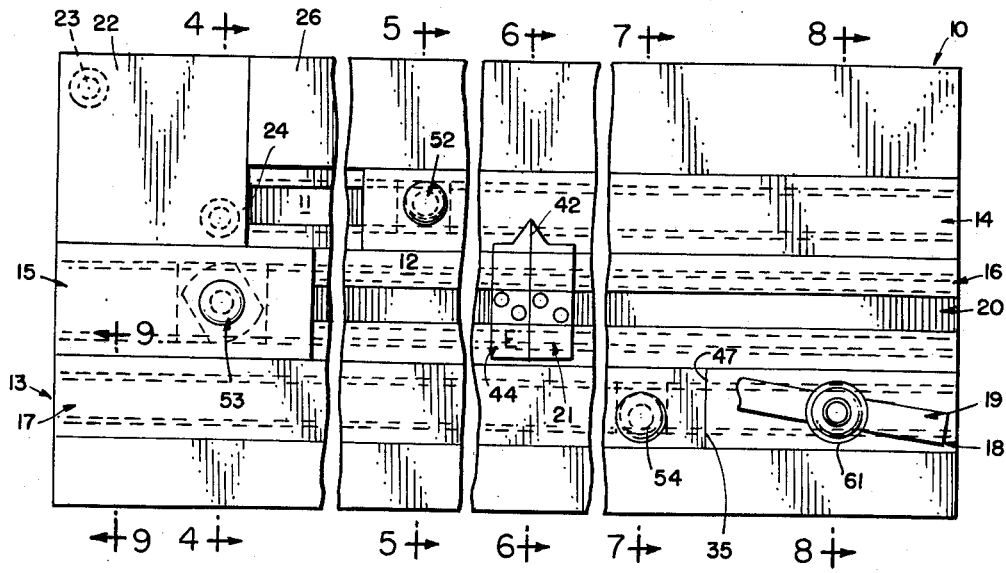

FIG. 3 is an enlarged broken view of the cam cut-down calculator of FIGS. 1 and 2, with the measuring scale numerals removed for purposes of clarity; and FIGS. 4 through 9 are transverse sectional views taken through FIG. 3 substantially along lines 4—4, 5—5, 6—6, 7—7, 8—8, and 9—9, illustrating details of construction of the cam cut-down calculator of the invention.

Referring now to the drawings, and particularly to FIGS. 1 and 2, the cam cut-down calculator of the present invention includes generally a base 10 comprising an elongated bar having a plurality of tracks 11, 12 and 13 extending parallel to each other and longitudinally of the base. The track 11 receives a turret slide 14, while the track 12 receives a cutoff slide 15 and a tool slide 16. A length of piece slide 17 and a second turret slide 18 is received in the track 13. A tool scale 19 is adjustably received on the second turret slide 18. The tool slide 16 is provided with a track 20 for slidably receiving an index means or indicator 21. The faces of the slides are coplanar with each other and with the face of the base 10. Manipulation of the slides, the indicator and tool scale serve to calculate cam cut-down and tool clearance with the work piece or piece part when the turret is indexing.

In the upper left-hand corner of the base, a substantially square plate 22 is secured thereto by suitable fasteners 23, and recessed into the base so that the outer face of the plate is coplanar with the face of the base 10. The base 10 is rectangular in shape, and the sides of the substantially square plate 22 are parallel to the sides of the base 10. The right-hand edge 24 of the plate 22 extends perpendicular to the track 11 and extends downwardly to the bottom of the track. This edge 24 represents the face of the spindle or chuck and is so indicated by indicia 25 on the plate 22. The face of the spindle is the reference point from which all measurements are taken to determine cam cut-down and tool clearance.

Automatic screw machines are built in various sizes with carious capacities, and before making any calculations on the cam cut-down calculator, the machine capacity must be known. Calculations of the calculator are based on determining the cam cut-down on a full height lead cam.

The face of the base 10 includes an upper face portion 26 and a lower face portion 27. The machine capacity on an automatic screw machine is determined by the distance between the face of the spindle and the face of the turret when the turret is in the position at the top of a nine inch lead cam, and the turret is in the middle adjustment on the slide. Thus, the machine capacity equals the least distance between the face of the spindle and the face of the turret, and because the capacity is taken at the distance when the turret is in the middle adjustment, minor adjustment in either direction of the turret can be made on its slide after the lead cam has been installed if such variation is needed for adjustment purposes.

Indicia 28 is provided along the upper edge of the track 11 on the upper face portion 26 of the base in inch markings set off from the edge 24 of plate 22 or the face of the spindle. Indicia 29 on the upper face portion 26 indicates where on the calculator to measure the machine capacity and for reference purposes, labels the scale as "Scale A." The left-hand edge 30 of the turrent slide 14 represents the face of the turret and is capable of aligning with the indicia 28 on "Scale A" to measure the machine capacity.

The cutoff slide 15 is provided with inch mark measuring indicia 30 and a label 31 defining the slide as "Cutoff Scale F." At the right-hand end of the cutoff slide 15, a symbol 32 of a cutoff tool is provided to indicate that the right-hand edge 33 of the cutoff slide 15 represents the face of the cutoff tool. The measuring indicia 30 is arranged along the upper edge of the cutoff slide 15 so that the cutoff can be aligned with the face of the spindle. The cutoff equals the distance from the face of the spindle to the face of the cutoff tool.

The length of piece slide 17 represents the length of the piece part or work piece to be machined on the automatic screw machine and includes along its upper edge inch marking indicia 34 starting from the right edge of the slide and going to the left edge thereof. The right-hand edge 35 of the length of piece slide 17 represents the outer free end of the piece part as it extends from the face of the spindle, the inner end of the piece part being aligned with the cutoff face of the cutoff tool or in alignment with the edge 33 of the cutoff slide 15. Thus, the right-hand edge of the length of piece slide 17 represents the outer free end of the piece part, and the slide is labelled by indicia 34a "Length of Piece Scale D."

The tool slide 16 is arranged between the turret slide 14 and the length of piece slide 17 and carries inch mark indicia along its upper edge as identified by the numeral 36. This tool slide serves to represent the tool used in the machining operation on the piece part, whereby the left-hand edge of the slide as indicated at 37 represents the free end of the tool and is aligned with the inch mark indicia 34 on the length of piece slide 17 in accordance with the amount of machining or approach on the piece part as measured from the right-hand edge 35 of the length of piece slide 17. The tool slide 16 is labeled "Tool Scale C" as indicated at 38. The index means or indicator 21 includes a carrier 39, FIG. 6, slidably arranged in the track 20 and supporting a clear transparent window 40 slidable along the face of the tool slide 16. A hairline 41 is provided on the window 40 and extends normal to the longitudinal axis of the track 20 and upwardly along a triangular-shaped extension 42 in overlying relationship to the lower edge of the turret slide 14 and the inch mark indicia scale 43 on the turret slide. The indicator 21 is labeled "E" as indicated at 44 and serves to mark off the length of the tool on the indicia 36 of the tool slide 16 to determine the cam cut-down on the indicia 43 of the turret slide 14. The length of the tool is determined by the amount of tool projecting from the face of the turret. For convenience and understanding the operation of the calculator, the turret slide 14 is labeled "Turret Scale B" at 45.

The second tool slide 18 is labeled "H" at 46 for purposes of convenience and coacts with the tool scale 19 to determine whether or not the tool will clear the end of the piece part when the turret indexes. The left-hand edge of the second turret slide 18, designated by the numeral 47, represents the face of the turret and is aligned against the inch mark indicia 48 on the lower face portion 27 of the base 10 in accordance with the maximum distance between the face of the spindle and the turret face during the indexing operation. The lower face portion 27 with its indicia is labeled "Index Scale G" as indicated at 49 for purposes of convenience. The extreme retracted position of the turret is determined by the machine size and when the turret is at the extreme bottom of the cam and the turret in middle adjustment on its slide. It may be noted that the inch mark indicia 48 shows measuring from left to right from the face of the spindle, the zero mark being aligned therewith. The length of the tool is represented by the tool scale 19 as measured from the left edge 47 of the second turret slide 18, and the turret scale carries inch mark indicia 50 starting from the left end to the right end. The left end of the tool scale 19 thus represents the free end of the tool and if this end clears the right-hand edge 35 of the length of piece slide 17, the tool will clear the piece part when the turret is indexing. The left edge of the tool scale 19 may be designated by the numeral 51 for convenience purposes.

Referring now particularly to FIGS. 3 to 9, it is seen that each slide and its associated track has a tongue-and-grooved configuration, and that the upper and lower parallel edges of the tool slide 16 are in substantial contact with the lower edge of the turret slide 14 and the upper edges of the length of piece slide 17 and the second turret slide 18, respectively, thereby defining a compact arrangement for the calculator.

Locking means 52, 53 and 54 are respectively provided for selectively locking slides 14, 15 and 17 into a preset position when making a calculation. The locking means 52 and 54 substantially are identical and each include a shaft 55 journalled in its respective slide having a knurled knob 56 integral therewith and projecting outward from the face of the respective slide, and an eccentrically secured nylon circular plate 57 at the inner end arranged to be wedged in a groove of the respective track for locking the slides in position. The locking means 53 is substantially similar in that it also includes a shaft 58 journalled in the slide 15, having a knurled knob 59 projecting from the outer face of the slide, and a nylon locking plate 60 secured to the inner end of the slide which is sized to engage the bottoms of the grooves of the track when the knob is rotated a predetermined amount.

The calculator parts may be made of any suitable material, such as metal, plastic or the like, and the locking plates 57 and 60 are preferably made of a material softer than the material of the calculator so as to prevent damage of the track during operation of the locking plates. It can readily be understood that the locking means are operated by rotation of the knobs to either lock or unlock the slides into position on the base of the calculator.

Figures 4, 5, 6, 7, 8:
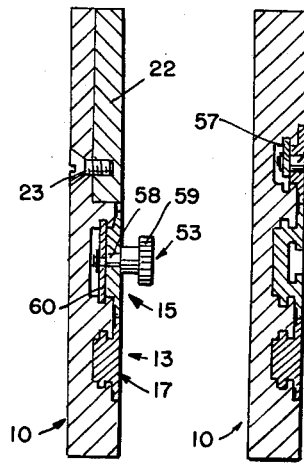
Figure 9:
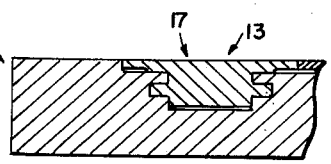

Referring now to the second turret slide 18, and particularly to FIGS. 3 and 8, it will be seen that the tool scale 19 is adjustably mounted on the turret slide 18 and locked into position by tightening or loosening of the nut 61 which is threadedly received on a stud 62 carried by the slide 18. A clamping member 63 is received on the stud and is provided with an opening in the stud 62 to receive the tool scale 19. Upon tightening of the nut 61 on the stud 62 the clamp 63 is forced downwardly against the tool scale 19 to lock it against a washer 64 arranged between the clamp 63 and the face of the turret slide 18 and thereby lock the tool scale 19 in position to the turret slide 18. The stud 62 is rotatably carried by the slide 18 and accordingly the tool scale 19 may be adjusted along the pivot connection of the stud 62 to the slide 18.

In operation of the cam cut-down calculator of the present invention for determining a cam cut-down measurement for a particular machining operation on a particular piece part on a certain size machine, the turret scale B is initially set to indicate the machining capacity on scale A.

Referring particularly to FIG. 2, and for illustration purposes to solve a particular problem, it will be assumed that the machine capacity is three and one-half inches whereby the left edge 30 of the turret scale B is aligned with the three and one-half inch mark on scale A. The locking means may then be operated for the turret slide 14 to lock the slide in that position. The cutoff scale F is then set to the cutoff measurement which as shown in FIG. 2 is set at one-half inch so the one-half inch mark aligns with the face of the spindle. Knowing the length of the piece part, the length of piece scale D is then preset in accordance with the length of the piece part as measured from the face of the cutoff tool or the edge 33 of the cutoff slide 15. Assuming the piece part to be three inches in length, the three inch marking on the scale D is aligned with the edge 33. Then the scale D is locked into position so that it cannot readily be moved. The machining on the piece part or approach along the piece part of the tool is then set by sliding the tool scale C or tool slide 16 so that the left-hand edge 37 aligns with the dimension of approach or machining as read on the scale D. Assuming this operation to be two inches, the two inch mark on scale D is aligned with the edge 37 on the tool scale C. Finally, the length of the tool is marked off on the indicia 36 on the tool scale C by use of the indicator E whereby the hairline 41 is aligned with a particular length of the tool. Assuming the tool length is three and one-eighth inches, the hairline on indicator E is aligned therewith and reading on the indicia of the turret scale B, it is seen that the cam cut-down is one and one-eighth inches. Thus, the cam cut-down is finally read on the indicia of the turret scale B as indicated by the hairline 41 of the indicator E. It may be appreciated that the entire machine capacity and machining operation is readily seen by manipulation of the slides on the cam cut-down calculator of this invention.

After determining the cam cut-down, without disturbing the settings of the slides, it can be determined whether or not there is tool clearance between the free end of the tool and the piece part during indexing of the turret. To this end, the left-hand edge 47 of the second turret slide H is aligned with the indicia on the index scale G in accordance with the retracted position of the turret. For a machine having a capacity of three and one-half inches, this may be about six and three-fourth inches, and accordingly the left edge 47 of the slide H is aligned with the six and three-fourth inch mark on the index scale G. The length of the tool, being three and one-eighth inches, as above indicated, is then set off by the tool scale 19 against the left-hand edge 47 of the turret slide H as indicated in FIG. 2. Inasmuch as the left-hand edge 51 of the tool scale 19 does not engage the right-hand edge 35 of the length of piece scale D, there will be tool clearance during the indexing operation. Should the end 51 of the tool scale 19 engage or overlap the edge 35 of the length of piece scale D, there would be interference between the tool and the piece part during the indexing operation. This would necessitate changing the tool or the machine capacity. This might be accomplished within certain limits by adjustment of the turret on its slide. It may be appreciated that movement of the tool scale 19 along the slide H is accomplished by loosening of the nut 61, and then locking of the tool scale in place would be accomplished by tightening of the nut 61.

It will be understood that modifications and variations may be effected without departing from the scope of the novel concepts of the present invention, but it is understood that this application is to be limited only by the scope of the appended claims.

The invention is hereby claimed as follows:

1. A cam cut-down calculator for determining the cut-down of the lead cam for an automatic screw machine, said calculator comprising an elongated base having upper, middle and lower parallel adjacent tracks extending longitudinally thereof, reference means at the left end of the base extending transverse the upper track and representing the face of the spindle, measure marking indicia along the upper edge of the upper track measuring from the face of the spindle, a turret slide in said upper track for representing the machine capacity and having measure marking indicia along the lower edge thereof, a cutoff slide in the middle track having measure marking indicia along the upper edge measuring against said reference means from the right-hand end thereof which end represents the face of a cutoff tool, a length of piece slide movable in the lower track having measure marking indicia along the upper edge measuring against the right-hand end of said cutoff slide from the right-hand end thereof which end represents the free end of a piece part extending from the spindle, and a tool slide movable in the middle track, the left-hand end of the tool slide representing the approach or machining by the tool on the piece part and being measured along the measure marking indicia of said length of piece slide and measure marking indicia along the upper edge of said tool slide measuring from the left-hand end thereof against the measure marking indicia at the lower edge of said turret slide to determine the cam cut-down.

2. A cam cut-down calculator for determining the cut-down of the lead cam for an automatic screw machine, said calculator comprising an elongated base having three parallel adjacent tracks extending longitudinally thereof, means at the left end of the base extending transverse the upper track and representing the face of the spindle, measure marking indicia along the upper edge of the upper track measuring from the face of the spindle, a turret slide in said upper track for representing the machine capacity, a cutoff slide in the track below the upper track having measure marking indicia along the upper edge measuring from the right-hand end thereof which end represents the face of a cutoff tool, a length of piece slide movable in the lower track having measure marking indicia along the upper edge measuring from the right-hand end thereof which end represents the free end of a piece part extending from the spindle, a tool slide movable in the track having the cutoff slide, the left-hand end of the tool slide representing the approach or machining by the tool on the piece part and being measured along the measure marking indicia of said length of piece slide, measure marking indicia along the upper edge of said tool slide measuring from the left-hand end thereof to set off the length of the tool, measure marking indicia along the lower edge of said turret slide, and an indicator slidable along said tool slide and overlapping the measure marking indicia on the tool and turret slides.

3. The combination as defined in claim 2, and means for selectively locking said turret, cutoff and length of piece slides in position on the base.

4. A cam cut-down calculator for determining the cut-down of the lead cam for an automatic screw machine, said calculator comprising an elongated base having three parallel adjacent tracks extending longitudinally thereof, a reference point at the left end of the upper track representing the face of the spindle, a turret slide movable in the upper track, the left-hand end of the turret slide representing the face of the turret, wherein the left-hand end of said turret slide is adapted to be spaced from the reference point a distance equal to the distance between the turret face and the face of the spindle when the turret is at the top of the lead cam, a cutoff slide in the track below the upper track, the right-hand end of said cutoff slide representing the face of a cutoff tool and adapted to be spaced from said reference point a distance equal to the distance between the face of the spindle and the face of the cutoff tool, a length of piece slide movable in the lower track, the right-hand end of the length of piece slide representing the free end of the piece part and adapted to be spaced from the right-hand end of the cutoff slide a distance equal to the length of the piece part, a tool slide movable in the track immediately above the lower track, the left-hand end of the tool slide representing the free end of a turret tool and adapted to be spaced inward from the right-hand end of the length of piece slide a distance equal to the approach of the tool onto the piece part, a hairline indicator movable on said tool slide representing the face of the turret and adapted to be spaced from the left-hand end of the tool slide a distance equal to the length of the tool projecting from the face of the turret, whereby the distance between the left-hand end of the turret slide and the hairline indicator equals the cam cut-down on the lead cam.

5. A cam cut-down calculator for determining the cut-down of the lead cam of an automatic screw machine and whether a turret tool will clear the piece part during indexing of the turret, said calculator comprising a base having three parallel tracks extending longitudinally thereof, a reference point at the left end of the upper track representing the face of the spindle, a turret slide movable in the upper track, the left-hand end of the turret slide representing the face of the turret, wherein the left-hand end of said turret slide is adapted to be spaced from the reference point a distance equal to the distance between the turret face and the face of the spindle when the turret is at the top of the lead cam, a cutoff slide in the track below the upper track, the right-hand end of said cutoff slide representing the face of a cutoff tool and adapted to be spaced from said reference point a distance equal to the distance between the face of the spindle and the face of the cutoff tool, a length of piece slide movable in the lower track, the right-hand end of the length of piece slide representing the free end of the piece part and adapted to be spaced from the right-hand end of the cutoff slide a distance equal to the length of the piece part, a tool slide movable in the track immediately above the lower track, the left-hand end of the tool slide representing the free end of a turret tool and adapted to be spaced inward from the right-hand end of the length of piece slide a distance equal to the approach of the tool onto the piece part, a hairline indicator movable on said tool slide representing the face of the turret and adapted to be spaced from the left-hand end of the tool slide a distance equal to the length of the tool projecting from the face of the turret, whereby the distance between the left-hand end of the turret slide and the hairline indicator equals the cam cut-down on the lead cam, a second turret slide in the lower track, the left-hand end of said second turret slide representing the face of the turret and adapted to be spaced from the reference point a distance equal to the distance between the turret face and the face of the spindle when the turret is at the bottom of the lead cam, and a scale slidable on said second turret slide, the left-hand end of the scale representing the free end of the turret tool and adapted to be spaced from the left-hand end of the second turret slide a distance equal to the length of the tool projecting from the face of the turret whereby if the left-hand end of the scale clears the right-hand end of the length of piece slide the turret tool will clear the piece part during indexing of the turret.

6. The calculator as defined by claim 4 wherein measure marking indicia is provided on the slides and the base for manipulating the slides in accordance with known dimensions.

7. The calculator as defined by claim 5 wherein measure marking indicia is provided on the slides and the base for manipulating the slides in accordance with known dimensions.

References Cited in the file of this patent

UNITED STATES PATENTS

| | | |
|---|---|---|
| 2,832,539 | Blakeley et al. | Apr. 29, 1958 |
| 2,848,164 | Spellman | Aug. 19, 1958 |